T. F. THOMAS.
KNOCKDOWN COMBINATION MINNOW TRAP AND LANTERN.
APPLICATION FILED MAY 20, 1912.
1,041,195.
Patented Oct. 15, 1912.
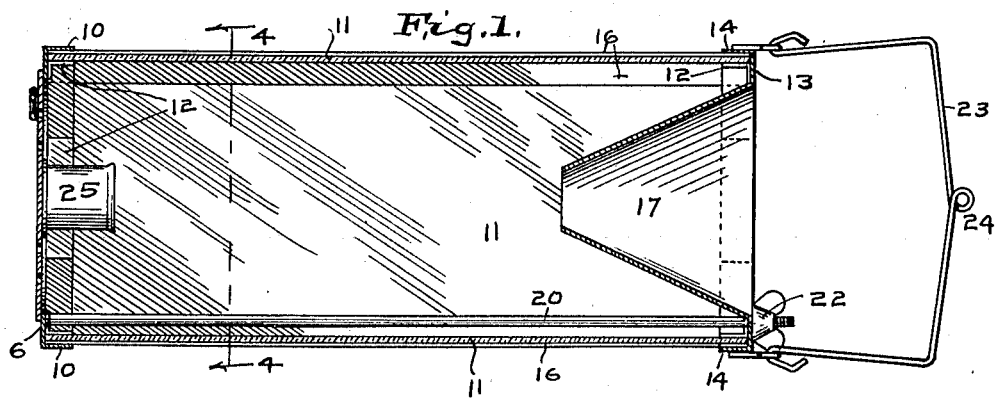
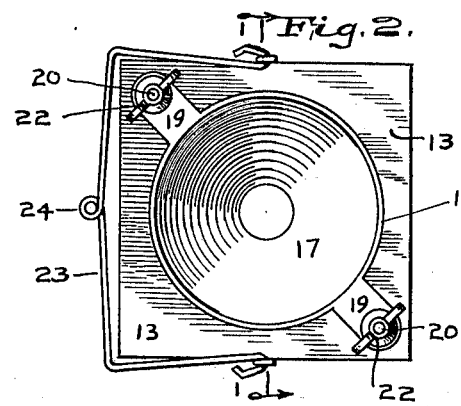
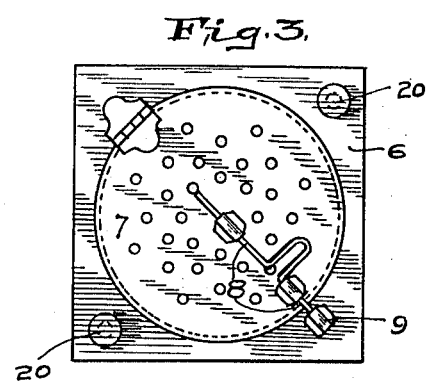
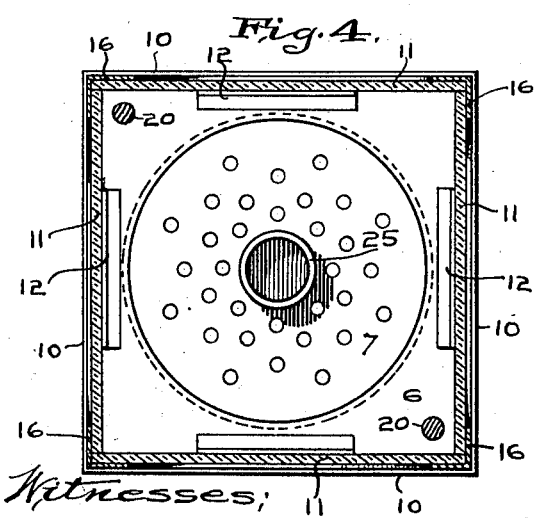
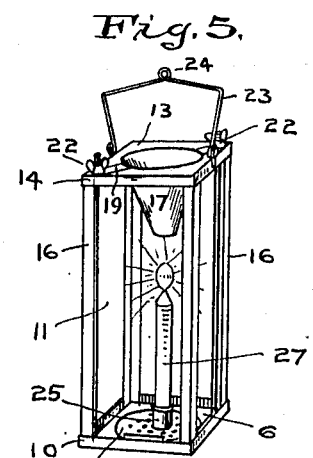
Witnesses:
J. H. Swan.
L. B. Koerner.
Inventor,
Thompson F. Thomas,
By Minturn & Woerner,
Attorneys.

UNITED STATES PATENT OFFICE.

THOMPSON F. THOMAS, OF INDIANAPOLIS, INDIANA.

KNOCKDOWN COMBINATION MINNOW-TRAP AND LANTERN.

1,041,195. Specification of Letters Patent. Patented Oct. 15, 1912.

Application filed May 20, 1912. Serial No. 698,537.

*To all whom it may concern:*

Be it known that I, THOMPSON F. THOMAS, a citizen of the United States, residing at Indianapolis, in the county of Marion and State of Indiana, have invented certain new and useful Improvements in Knockdown Combination Minnow-Traps and Lanterns, of which the following is a specification.

The object of this invention is to provide a minnow-trap with glass sides which will permit the minnows to see freely into the trap and also to admit light freely to the interior of the trap, and a further object is to provide a knock-down device which can be reduced to a small compass for the purposes of transportation and storage, and a further object is to provide a device of the above character which is equally adapted for use as a lantern at night when not in use for catching minnows.

I accomplish the objects of the invention by the mechanism illustrated in the accompanying drawing, in which—

Figure 1 is a longitudinal central section on the line 1—1 of Fig. 2. Fig. 2 is an elevation of the upper end of the trap with the bail in lowered position. Fig. 3 is an elevation of the trap looking at the lower or bottom end thereof. Fig. 4 is a transverse section on the line 4—4 of Fig. 1, and Fig. 5 is perspective view of the device in use as a lantern.

Like characters of reference indicate like parts throughout the several views of the drawing.

6 is the bottom of the trap which is preferably made out of tin or other sheet metal. It has a large central opening which is provided with a hinged door 7, here shown as fastened on the side opposite the hinge by means of an endwise sliding wire 8 secured to the door 7 and engaging a catch 9 on the bottom 6. The bottom is provided with an in-turned marginal flange 10, at right angles to the principal area of the bottom adjacent which the ends of the four glass sides 11 are placed and are held against said flange by the inside flanges 12 comprising metal angle strips having one of their members soldered to the bottom 6 in positions as shown in Fig. 4.

13 is the top of the trap which is formed out of sheet-metal similar to the bottom 6. This top also has its edges 14 turned in at right angles, and within these edges the upper ends of the sides 11 are placed and held by angle strips 12 similar to those described and shown for the bottom 6. Introduced between the corners of the glass sides 11 and the corners of the flanges 10 and 14 are the V-shaped binding strips 16 of tin or similar sheet-metal. These binder strips secure and protect the glass corners of the minnow-trap.

The top 13 is provided with a large circular central opening in which a sheet-metal funnel 17 is removably placed. The funnel 17 has a flange 18 at its large end which laps over the adjacent edges of the top 13, and it also has ear-extensions 19 at two diametrically opposite sides which are perforated for the passage therethrough of the bolts 20. The bolts 20, two in number, extend through the ears 19 and also through the top 13 and bottom 7. They are expanded at their lower ends to keep these ends from being drawn through the bottom 6, and their upper ends are threaded to receive wing-nuts 22. By screwing the wing-nuts 22 down against the top 13 when the bolts are in the position shown in the drawings in the assembled trap, all of the knockdown or separable parts of the device are securely fastened together in their desired operative position.

Secured to the flanges of the top 13 at central diametrically opposite points are suitable ears to which a bail 23 is attached in the usual manner, as shown. This bail serves as a handle in carrying the trap and for the attachment of a cord when it is desired to lower the trap in the water. A loop 24 is formed in the bail to tie to.

The hinged bottom 7 has secured to the inner side thereof a bait cup 25 in which the bait to lure the fish into the trap, is placed. This bait cup is of a suitable shape to form a socket for the attachment and holding of a candle 27, as shown in Fig. 5, which furnishes the material to be lighted for illuminating purposes when the device is used as a lantern. Instead of a candle, as shown, any suitable form of a torch or lamp using kerosene oil or other approved illuminant may be used.

The use of my device for a fish trap or as a lantern is so obvious that further description and explanation is unnecessary.

Having thus fully described my invention what I claim as new and wish to secure by Letters Patent of the United States, is—

1. In a minnow-trap, a lower end piece having a large opening, a removable closure for said opening, means secured to said closure for holding bait or material to be lighted as an illuminant, glass sides for said trap, an upper end piece having an opening an inturned funnel entering the trap through said opening and having a flange at its large end to limit the insertion, said funnel having ears, removable fastening means to engage said ears, and a bail secured to said upper end of the trap.

2. In a device for the purposes specified, upper and lower end pieces with inturned flanges and adjacent inside flanges, transparent side plates having their ends inserted between said inturned and inside flanges, binders V-shaped in cross section at the corners of the side plates, the ends of said plates and binders extending under the flanges of both end pieces, bolts for drawing the end pieces together, said lower end piece having a cup on its inner side for holding bait or material to be lighted as an illuminant, an inturned funnel entering the trap through an opening in the upper end piece, said funnel having an outside flange at its large end to limit the insertion of the funnel and having outwardly extended perforated ears through which some of said bolts are passed, and a bail secured to said upper end of the trap.

In witness whereof, I, have hereunto set my hand and seal at Indianapolis, Indiana, this, eighth day of May, A. D. one thousand nine hundred and twelve.

THOMPSON F. THOMAS. [L. S.]

Witnesses:
J. A. MINTURN,
F. W. WOERNER.

---

Copies of this patent may be obtained for five cents each, by addressing the "Commissioner of Patents, Washington, D. C."